(12) United States Patent
Umesaki et al.

(10) Patent No.: US 10,523,073 B2
(45) Date of Patent: Dec. 31, 2019

(54) ROTATING ELECTRIC MACHINE AND METHOD OF MANUFACTURING SAME

(71) Applicant: Hitachi Automotive Systems, Ltd., Hitachinaka-shi, Ibaraki (JP)

(72) Inventors: Yousuke Umesaki, Hitachinaka (JP); Hiroshi Hamano, Hitachinaka (JP); Takayuki Koizumi, Hitachinaka (JP); Seigo Misaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 18 days.

(21) Appl. No.: 15/755,226

(22) PCT Filed: Aug. 2, 2016

(86) PCT No.: PCT/JP2016/072572
§ 371 (c)(1),
(2) Date: Feb. 26, 2018

(87) PCT Pub. No.: WO2017/051609
PCT Pub. Date: Mar. 30, 2017

(65) Prior Publication Data
US 2018/0248430 A1    Aug. 30, 2018

(30) Foreign Application Priority Data
Sep. 25, 2015  (JP) .................................. 2015-187578

(51) Int. Cl.
*H02K 3/12*     (2006.01)
*H02K 1/16*     (2006.01)
(Continued)

(52) U.S. Cl.
CPC ................. *H02K 3/12* (2013.01); *H02K 1/16* (2013.01); *H02K 15/0421* (2013.01); *H02K 3/345* (2013.01)

(58) Field of Classification Search
CPC .. H02K 3/28; H02K 3/12; H02K 1/16; H02K 3/345; H02K 15/08; H02K 15/09;
(Continued)

(56) References Cited

U.S. PATENT DOCUMENTS 6,026,558 A *  2/2000  Yoshida ............. H02K 15/0056
                                                        228/179.1
6,181,043 B1*  1/2001  Kusase .................... H02K 3/12
                                                          310/180
(Continued)

FOREIGN PATENT DOCUMENTS

DE     102006019314     * 10/2007
JP         57-46641 A     3/1982
(Continued)

OTHER PUBLICATIONS

International Search Report (PCT/ISA/210) issued in PCT Application No. PCT/JP2016/072572 dated Nov. 15, 2016 with English translation (three pages).
(Continued)

*Primary Examiner* — Mang Tin Bik Lian
*Assistant Examiner* — Ahmed Elnakib
(74) *Attorney, Agent, or Firm* — Crowell & Moring LLP

(57) ABSTRACT

TIG welding can be applied, and short circuiting of stator winding due to a jointing material of coil conductors is prevented. A rotating electric machine includes a rotor; and a stator having a stator core and a stator winding, wherein the stator winding has a plurality of coil conductors, and joint parts connecting ends of the coil conductors protruding from an end face of the stator core, and the ends of the coil conductors have weir portions formed for blocking flow of metal of the joint parts.

11 Claims, 11 Drawing Sheets

(51) Int. Cl.
*H02K 15/04* (2006.01)
*H02K 3/34* (2006.01)

(58) Field of Classification Search
CPC ............... H02K 15/081; H02K 15/085; H02K 15/0421; H02K 15/0062; H02K 15/0068; Y10T 29/49009; Y10T 29/49012
USPC .................................................. 310/71, 201
See application file for complete search history.

(56) References Cited

U.S. PATENT DOCUMENTS

| | | | |
|---|---|---|---|
| 6,841,913 B2* | 1/2005 | Gorohata | H02K 3/12 |
| | | | 29/596 |
| 6,915,556 B2* | 7/2005 | Lenoir | H02K 15/0056 |
| | | | 219/125.11 |
| 7,615,906 B2* | 11/2009 | Sakai | H02K 3/12 |
| | | | 29/596 |
| 8,443,509 B1* | 5/2013 | De Souza | H02K 15/0081 |
| | | | 29/564.2 |
| 10,003,232 B2* | 6/2018 | Goto | B23K 9/167 |
| 2002/0041129 A1* | 4/2002 | Oohashi | H02K 15/0056 |
| | | | 310/179 |
| 2003/0067239 A1 | 4/2003 | Nakamura | |
| 2012/0319522 A1* | 12/2012 | Ikeda | H02K 3/12 |
| | | | 310/201 |
| 2013/0106231 A1* | 5/2013 | Chamberlin | H02K 3/12 |
| | | | 310/201 |
| 2015/0214820 A1* | 7/2015 | Geoffrion | H02K 15/0068 |
| | | | 219/85.22 |
| 2017/0257002 A1* | 9/2017 | Ishizuka | H02K 3/12 |
| 2017/0346358 A1* | 11/2017 | Fukuda | H02K 3/28 |
| 2018/0248430 A1* | 8/2018 | Umesaki | H02K 15/0081 |

FOREIGN PATENT DOCUMENTS

| | | |
|---|---|---|
| JP | 2003-116242 A | 4/2003 |
| JP | 2014-7795 A | 1/2014 |
| JP | 2014-36562 A | 2/2014 |

OTHER PUBLICATIONS

Japanese-language Written Opinion (PCT/ISA/237) issued in PCT Application No. PCT/JP2016/072572 dated Nov. 15, 2016 (four pages).

Extended European Search Report issued in counterpart European Application No. 16848397.2 dated Apr. 24, 2019 (eight (8) pages).

* cited by examiner

ROTATING ELECTRIC MACHINE AND METHOD OF MANUFACTURING SAME

TECHNICAL FIELD

The present invention relates to a rotating electric machine and a method of manufacturing the same.

BACKGROUND ART

A rotating electric machine such as a motor and a generator mounted on a vehicle for use includes a rotor, and a stator having a stator core with a plurality of slots and a stator winding wound through the slots. The stator winding is wound in a form of phase windings along the circumferential direction of the stator core, and the phase windings are arranged in the radial direction of the stator core, that is from the inner side to the outer side.

Each stator winding is formed by inserting ends of conductor segments formed in a substantially U-shape into the slots from a first end face of the stator core in the axial direction, and joining the ends drawn out from the slots on at second end face of the stator core by TIG welding, for example.

When the ends of the conductor segments are joined by TIG welding, the joint parts are formed in drop-like shape by the molten metal for welding. The drop-like joint parts have large conductor diameters, which may cause short-circuit of portions of the stator winding adjacent in the radial direction of the stator core.

Thus, a method of joining the ends of conductor segments by laser welding has been employed. In laser welding, a recess is formed on one side face of each conductor segment, the conductor segments are subjected to laser irradiation in a state in which the recesses face each other, so that joint surfaces are welded (for example, refer to PTL 1). It is mentioned that, with this method, since a joint part is formed on the side of conductor segments facing each other, portions of the stator winding neighboring in the radial direction of the stator core are prevented from short-circuiting.

CITATION LIST

Patent Literature

PTL 1: JP 2003-116242 A

SUMMARY OF INVENTION

Technical Problem

With the method of joining the conductor segments by laser welding, however, the facility will be large in size and the cost will be high. In addition, high accuracy will be required for close contact between the joint surfaces during processing and joining of the joint parts of the conductor segments, which results in low productivity.

Solution to Problem

A rotating electric machine according to one aspect of the invention includes: a rotor; and a stator having a stator core and a stator winding, wherein the stator winding has a plurality of coil conductors, and joint parts connecting ends of the coil conductors protruding from an end face of the stator core, and the ends of the coil conductors have weir portions formed for blocking flow of metal of the joint parts.

A method of manufacturing a rotating electric machine according to another aspect of the invention joins a pair of coil conductors of the rotating electric machine at the ends of the coil conductors by TIG welding or TIG brazing.

Advantageous Effects of Invention

According to the invention, short circuit of the stator winding due to the shapes of joint parts at ends of coil conductors is prevented.

DESCRIPTION OF EMBODIMENTS

Embodiments of the invention will now be described with reference to the drawings.

In the description below, a rotating electric machine for a hybrid electric vehicle is used as an example of a rotating electric machine. In addition, in the description below, an "axial direction" refers to a direction along a rotation axis of the rotating electric machine, and a "circumferential direction" refers to a direction along a rotating direction of the rotating electric machine. In addition, a "radial direction" refers to a radius vector direction (radial) centered at the rotation axis of the rotating electric machine.

First Embodiment

Figure 1:
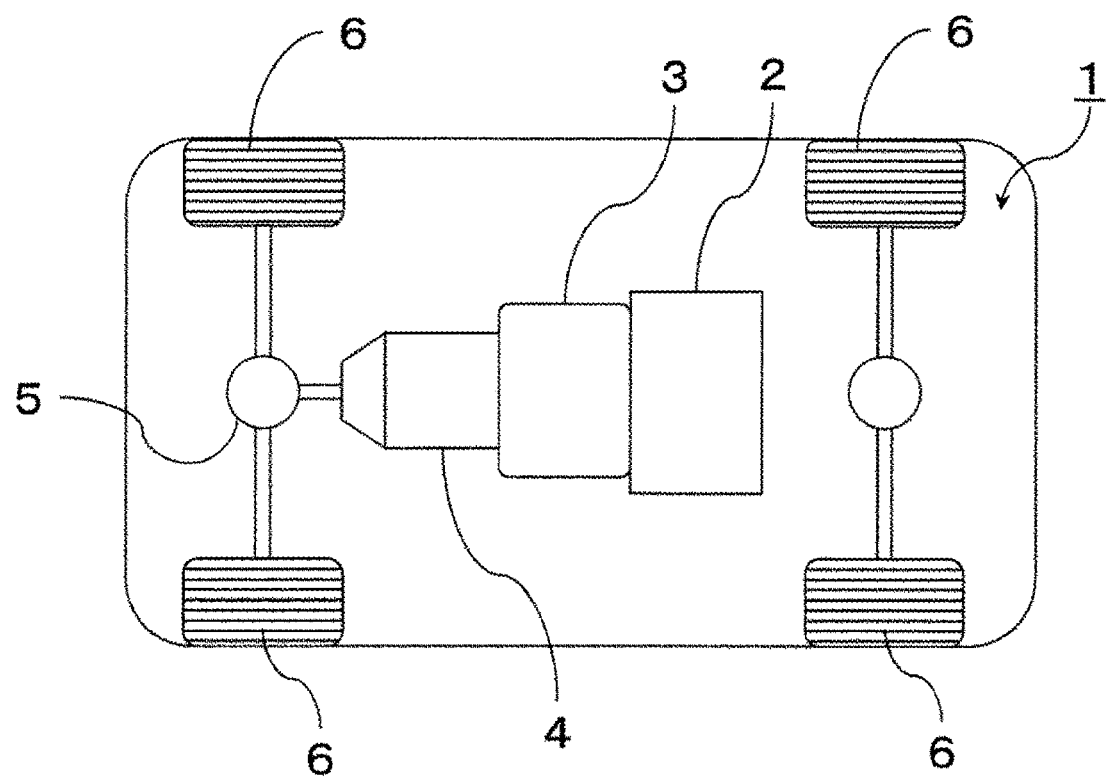
FIG. 1 is a block diagram of a hybrid electric vehicle.

A first embodiment of a rotating electric machine of the invention will now be described with reference to FIGS. 1 to 6. FIG. 1 is a block diagram of a hybrid electric vehicle on which a rotating electric machine according to an embodiment of the invention is mounted. An engine 2 that is a vehicle power source and a rotating electric machine 3 are mounted in on a vehicle 1. Note that two rotating electric machine having different functions may be used, and in this case, one rotating electric machine perform both of generation and vehicle driving while the other rotating electric machine performs vehicle driving. Torque of the engine 2 and the rotating electric machine 3 is transmitted to wheels (driving wheels) 6 via a transmission 4, such as a continuously variable transmission or a stepped automatic transmission, and a differential gear 5. The rotating electric machine 3 is mounted between the engine 2 and the transmission 4 or inside the transmission 4. Thus, the rotating electric machine 3 needs to be smaller with higher power output such that the influence of the space on the vehicle 1 is minimized.

Figure 2:
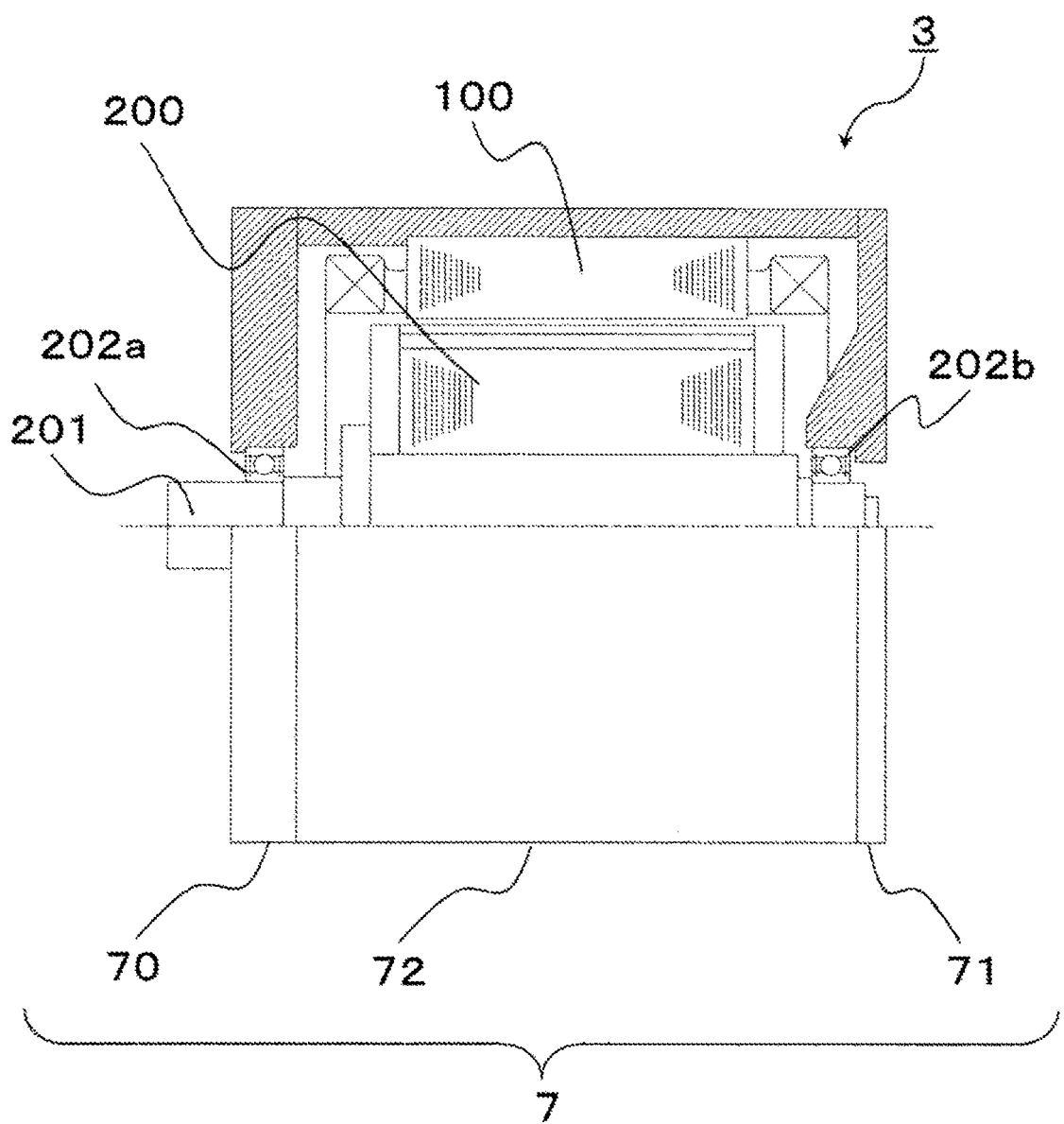
FIG. 2 is a cross-sectional view of a rotating electric machine according to a first embodiment of the invention.

FIG. 2 is a cross-sectional view illustrating the rotating electric machine 3 illustrated in FIG. 1 in a simplified manner, in which an upper area above a shaft 201 is illustrated in cross section and a lower area below the shaft 201 is illustrated in side view. The rotating electric machine 3 is accommodated inside a case 7 constituted by a front bracket 70, a rear bracket 71, and a housing 72. The case 7 is typically an integrated case constituted by the front bracket 70 and the housing 72 or an integrated case constituted by the rear bracket 71 and the housing 72. In addition, when the rotating electric machine 3 is disposed between the engine 2 and the transmission 4 as illustrated in FIG. 1, the case 7 is constituted by a case of the engine 2 or a case of the transmission 4. The rotating electric machine 3 may alternatively be mounted inside the transmission 4, and the case 7 may be constituted by the case of the transmission 4.

The rotating electric machine 3 includes a stator 100 and a rotor 200. An outer side of the stator 100 is fixed to an inner side of the housing 72. The rotor 200 is disposed on an inner side of the stator 100 with a slight clearance therebetween. The rotor 200 is fixed to the shaft 201, which is a rotating shaft, and rotates integrally with the shaft 201. The shaft 201 has respective ends rotatably supported by the front bracket 70 and the rear bracket 71 with bearings 202a and 202b, respectively.

Figure 3:
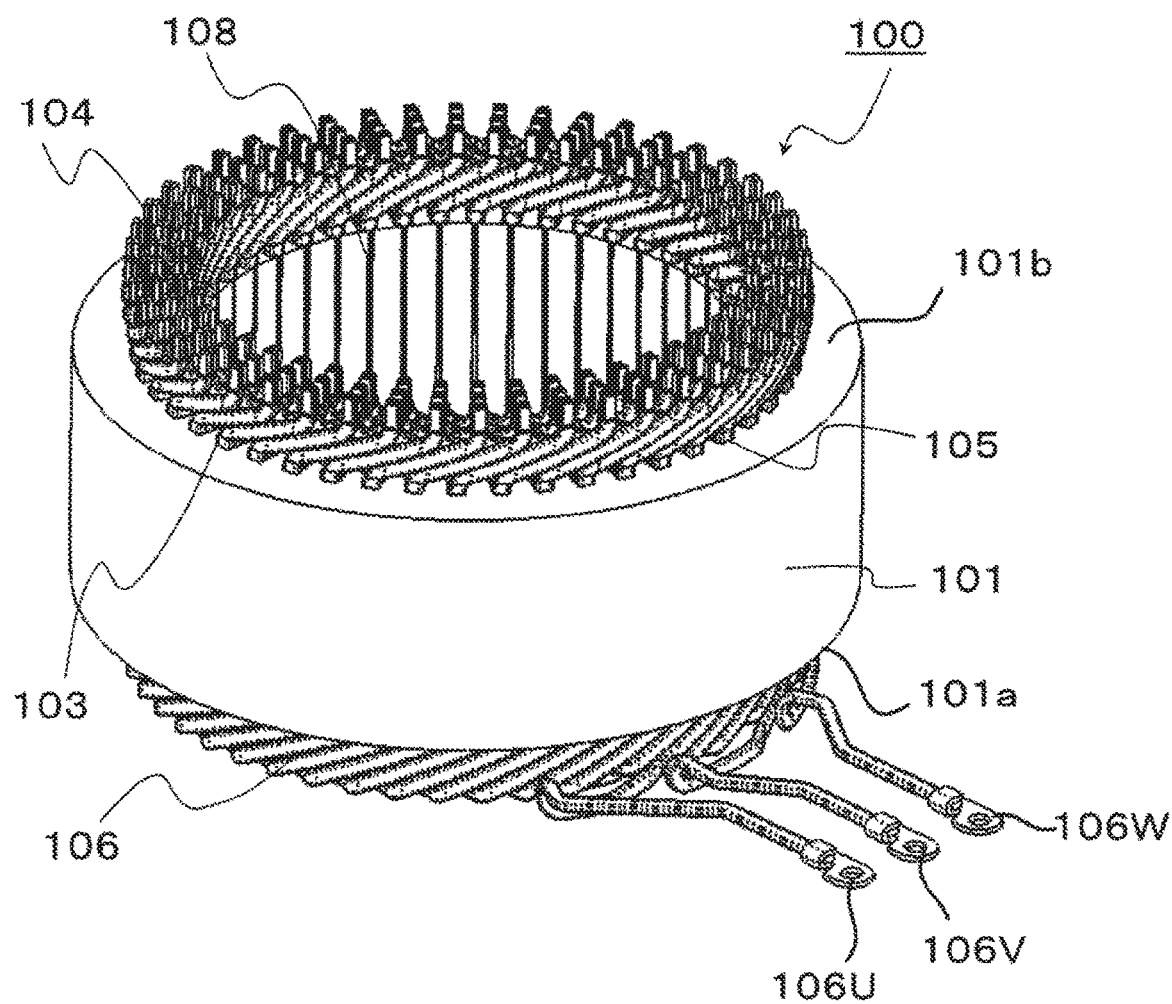
FIG. 3 is an external perspective view of a stator of the rotating electric machine.

FIG. 3 is an external perspective view of the stator of the rotating electric machine. The stator 100 includes a stator core 101 having a plurality of slots 105 arranged in the circumferential direction, and a stator winding 103 having coil conductors 102a to 102f (see FIG. 4). The slots 105 are arranged at regular intervals with a predetermined pitch in an inner surface of the stator core 101. The respective slots 105 is formed through the stator core 101 from first end face 101a to second end face 101b of the stator core 101. Slits 108 through which the respective slots 105 communicate with an inner space of the stator core 101 are formed in the inner surface of the stator core 101.

The stator core 101 is made of a laminated steel sheet that is a laminate of electromagnetic steel sheets. Although not illustrated, the stator winding 103 is a three-phase winding with wiring ends connected in star connection. Three-phase alternating currents of U, V, and W phases flow through the stator winding 103, and the rotating electric machine 3 operates as a motor or a generator/motor.

Figure 4:
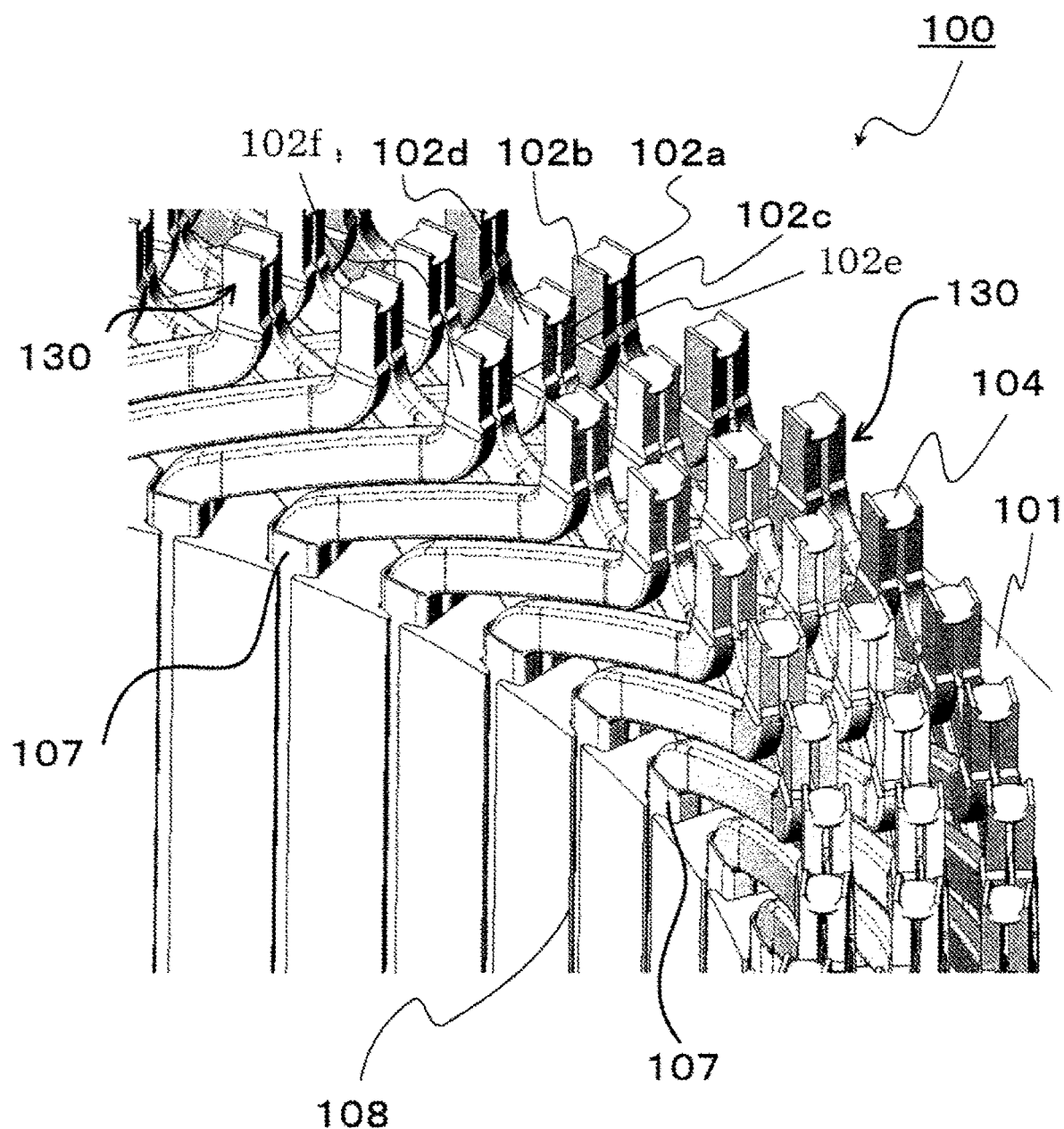
FIG. 4 is an enlarged perspective view illustrating the vicinity of a joint part of a stator winding of the rotating electric machine illustrated in FIG. 3.

FIG. 4 is an enlarged perspective view illustrating the vicinity of a joint part of the stator winding of the rotating electric machine illustrated in FIG. 3. The stator winding 103 is formed by connecting a plurality of segment coil conductors 102a to 102f of the respective phases having a U-shape in their entirety. The segment coil conductors each have a pair of straight legs having ends represented by a reference numeral 130 in FIG. 4, and lead-out terminals 106U, 106V, and 106W of the respective phases are connected by connecting wires to a conductor lead-out part 106 connecting the pair of straight legs in a U-shape as illustrated in FIG. 3. The coil conductors 102a to 102f are made of conductive metal such as copper. The pair of legs of each of the coil conductors 102a to 102f having a U-shape are inserted in the slots 105 from the first end face 101a of the stator core 101 and protrude from the second end face 101b of the stator core 101. The pairs of legs of the respective segment coil conductors are inserted in different slots, and a set of ends 130 of the same phase protruding from different slots are welded as illustrated in FIG. 4 and forms a joint part 104 illustrated in FIG. 5.

The slots 105 are formed to have a long rectangular cross-sectional shape along the radial direction of the stator core 101. Six coil conductors 102a to 102f are arranged in the radial direction and inserted in each of the slots 105. Portions of the coil conductors 102a to 102f inserted into the slots 105 are wrapped by slot insulating paper 107 (see FIG. 4). The slot insulating paper 107 insulates the stator core 101 and the coil conductors 102a to 102f from each other. In addition, the slot insulating paper 107 insulates adjacent coil conductors 102a to 102f inserted in one slot 105 from each other. Instead of the slot insulating paper 107, insulating layers such as varnish may be provided over the outer surfaces of the coil conductors 102a to 102f.

The coil conductors 102a to 102f other than the ends 130 protruding from the second end face 101b of the stator core 101 are coated with insulating coating 131 such as enamel or varnish. The coil conductors 102a and 102b constitute a U-phase winding, for example, the coil conductors 102c and 102d constitute a V-phase winding, for example, and the coil conductors 102e and 102f constitute a W-phase winding, for example. The legs of coil conductors 102a to 102f are respectively welded and connected with the legs of other coil conductors 102a to 102f of the same phase, and form the stator winding 103 having an annular shape.

Figure 5:
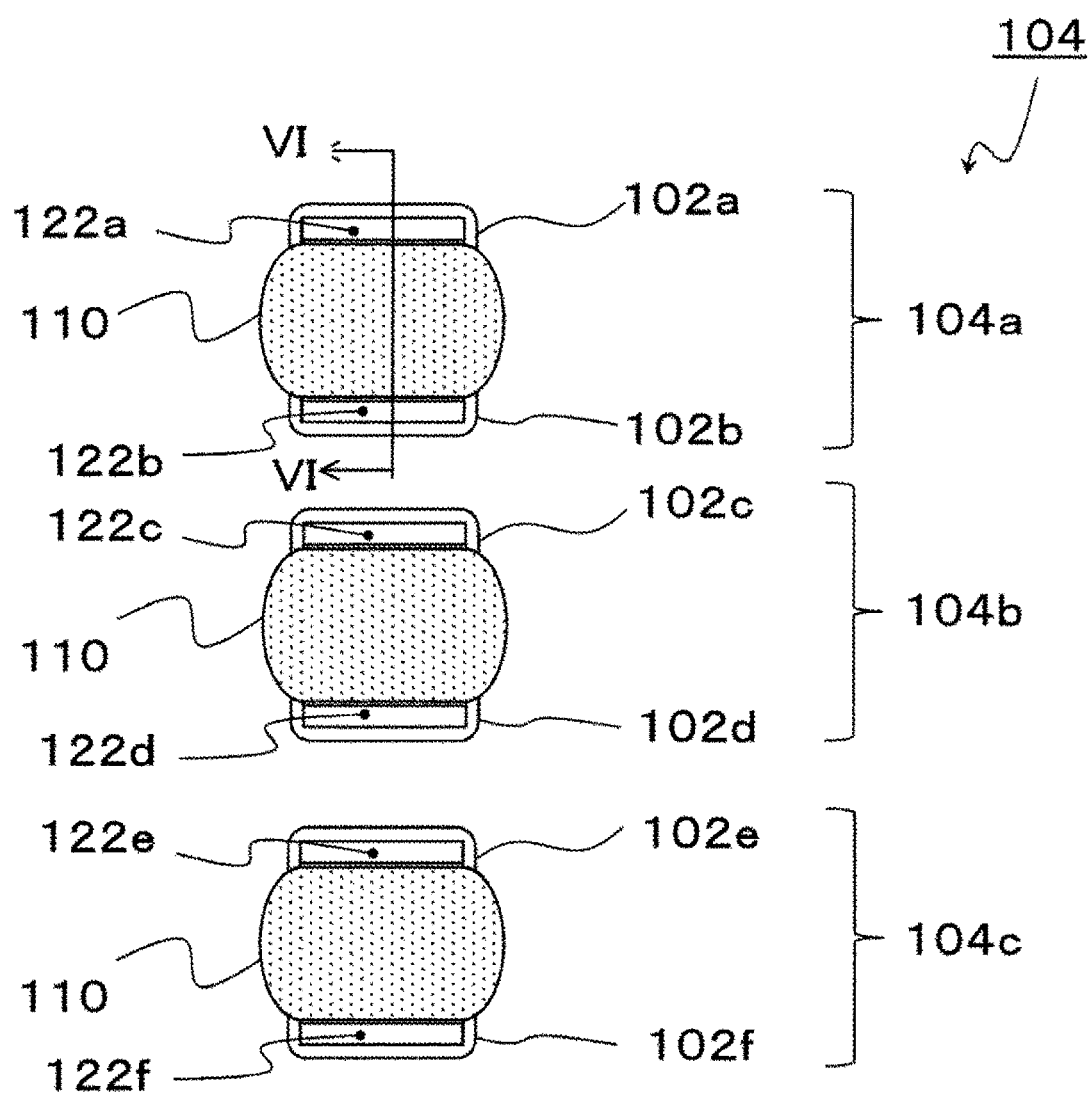
FIG. 5 is an enlarged plan view of joint parts of coil conductors illustrated in FIG. 4 as viewed from end face sides of the coil conductors.
Figure 6:
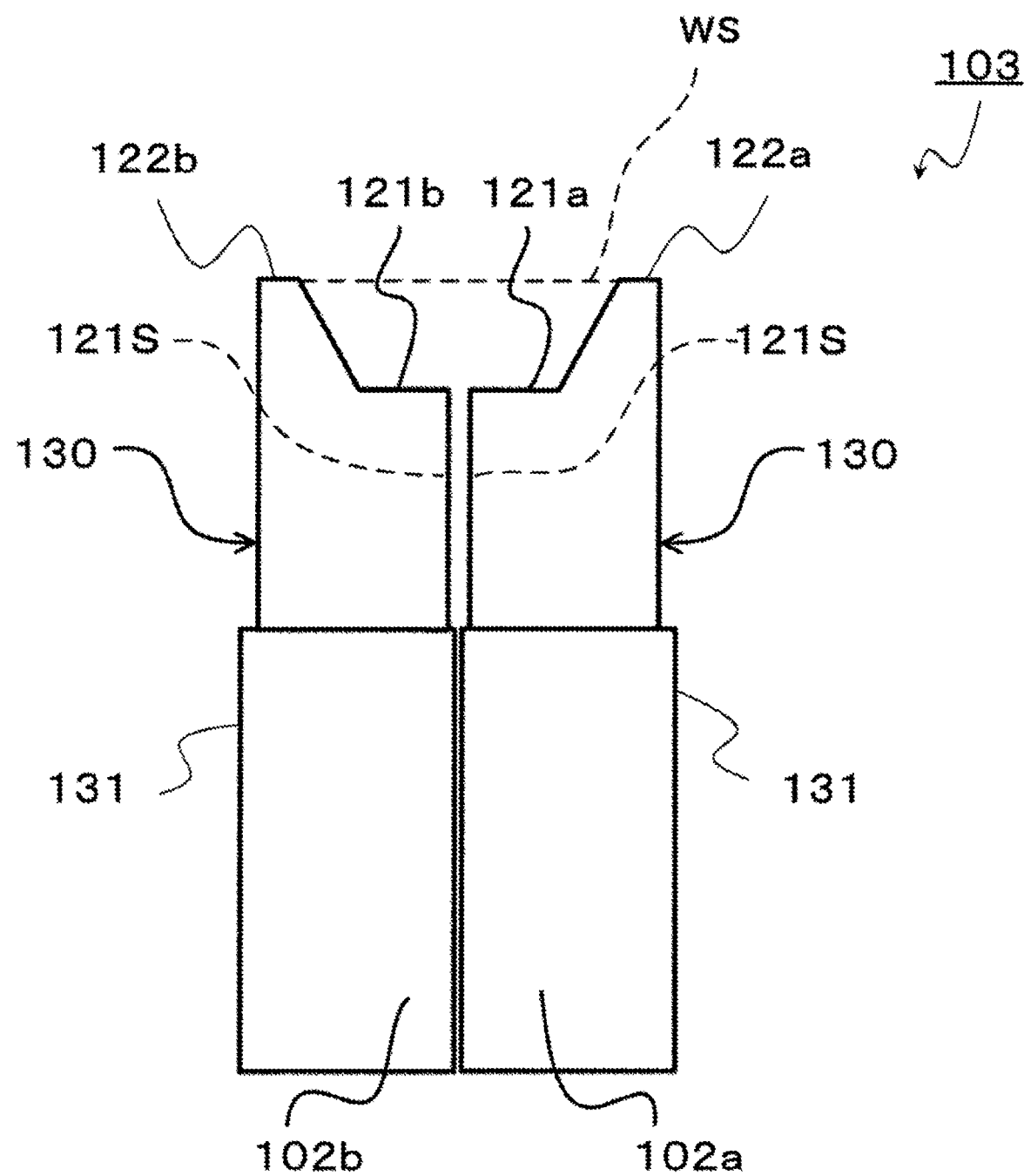
FIG. 6 is an enlarged side view illustrating a structure before welding in the vicinity of ends of the coil conductors illustrated in FIG. 4 as viewed in a direction perpendicular to a radial direction of a stator core.

FIG. 5 is an enlarged plan view of joint parts of coil conductors illustrated in FIG. 4 as viewed from end face sides of the coil conductors. FIG. 6 is an enlarged side view of the vicinity of ends of the coil conductors illustrated in FIG. 4 before being welded as viewed in a direction perpendicular to the radial direction of the stator core. Note that the direction perpendicular to the radial direction of the stator core refers to a direction in which a cross-section of an end 130 taken along line VI-VI in FIG. 5 illustrating a state after welding is viewed. The coil conductors 102a to 102f are members called rectangular wires having a substantially rectangular cross-sectional shape.

A structure of a joint part 104 of coil conductors will be described with reference to a joint part 104a of the coil conductors 102a and 102b as an example.

For example, the leg of a U-phase coil conductor 102a is located at a backmost position of a slot of the stator core 101, protrudes from the first end face 101a of the stator core and is bent in the circumferential direction as illustrated in FIG. 4. Although not illustrated, the leg of a U-phase coil conductor 102b is located on an inner side of the backmost position of the slot of stator core 101, protrudes from the first end face 101a of the stator core and is bent in the circumferential direction. The coil conductor 102b is located on the inner side of the coil conductor 102a at the backmost position in the slot.

As illustrated in FIG. 6, the insulating coating 131 is removed from each of the ends 130 of the coil conductors 102a and 102b. The end 130 of the coil conductor 102a has a flat end face 121a on the inner side of the stator core, and a weir portion 122a with a rising slope from the end face 121a on the outer side of the stator core. The end 130 of the coil conductor 102b has a flat end face 121b on the outer side of the stator core, and a weir portion 122b with a rising slope from the end face 121b on the inner side of the stator core. Thus, a pair of coil conductors 102a and 102b that are welded with each other are formed such that the coil conductor 102a on the outer side of the stator core has the weir portion 122a formed along a long side on the outer side of the stator, and that the coil conductor 102b on the inner side of the stator core has the weir portion 122b formed along a long side on the inner side of the stator. The ends 130 of coil conductors 102c and 102d and the ends 130 of coil conductors 102e and 102f also have end faces 121a to 121f and weir portion 122c to 122f, respectively. As described above, the weir portion 122a to 122f protruding in the axial direction from the end face 121a to 121f are formed at the ends 130 of the coil conductors 120a to 120f. In addition, a side face 121s of the coil conductor 102a facing the inner side of the stator core and a side face 121s of the end face 121b of the coil conductor 102b facing the outer side of the stator core are arranged to be in surface contact with each other. Thus, the weir portion 122a and the weir portion 122b are opposed to each other and form a pool space WS of molten metal is formed in a valley therebetween. The bottom of the pool space WS is constituted by the flat end faces 121a and 121b.

The coil conductors 102a and 102b are joined by tungsten inert gas (TIG) welding or TIG brazing.

As illustrated in FIG. 5, the coil conductors 102a and 102b are welded on the end faces 121a and 121b of the coil conductors 102a and 102b, and joined by a jointing material 110 obtained by solidification of molten metal in the pool space WS (see FIG. 6). The jointing material 110 obtained by solidification of molten metal is formed to stick out from side faces of the end faces 121 of the coil conductors 102a and 102b in the circumferential direction. In the radial direction of the stator core, however, molten metal is blocked by the weir portions 122a and 122b of the coil conductors 102a and 102b. Thus, molten metal does not leak to the outer side of the weir portion 122a of the coil conductor 102a and the inner side of the weir portion 122b of the coil conductor 102b during welding. In other words, the jointing material 110 does not stick out to the outer side nor to the inner side in the radial direction of the stator core.

The structures of a joint part 104b of the coil conductors 102c and 102d and a joint part 104c of the coil conductors 102e and 102f are the same as that of the joint part 104a. Thus, at the joint part 104b, the weir portions 122c and 122d formed on the coil conductors 102c and 102d, respectively, prevent molten metal from flowing in the radial direction of the stator core 101 during welding. Thus, at the joint part 104c, the weir portions 122e and 122f formed on the coil conductors 102e and 102f, respectively, prevent molten metal from flowing in the radial direction of the stator core 101 during welding. In other words, the jointing material 110 does not stick out to the outer side nor to the inner side in the radial direction of the stator core at the joint part 104b of the coil conductors 102c and 102d and the joint part 104c of the coil conductors 102e and 102f as well.

The joint part 104a is located on the outermost side of the stator core 101, the joint part 104c is located on the innermost side of the stator core 101, and the joint part 104b is located between the joint part 104a and the joint part 104c. Thus, the joint part 104a to 104c are arranged adjacent to one another in the radial direction of the stator core 101. At the respective joint part 104a to 104c, however, the weir portion 122a to 122f formed on the coil conductors 102a to 103f blocks the jointing material 110 from flowing to adjacent joint parts 104 in the radial direction of the stator core 101 during welding. This prevents short circuit of the stator winding 103 due to the jointing material 110.

According to the first embodiment described above, the following effects are produced. In the following explanation of the effects, the coil conductors 102a to 102f and the weir portion 122a to 122b will be referred to as coil conductors 102 and weir portions 122, respectively. (1) The flat end faces 121 joined by the jointing material 110 and the weir portions 122 protruding in the axial direction from the end faces 121 are formed on the respective ends 130 of the coil conductors 102. Thus, the flow of molten metal for welding is blocked by the weir portions 122, and the jointing material 110 will not become a large block in a drop-like ball shape. This prevents short circuit of adjacent portions of stator winding 103.

(2) The jointing material 110 is melted to join a pair of coil conductors 102 at the joint part 104. Thus, jointing can be achieved by welding such as TIG welding or TIG brazing without using laser welding, which allows avoidance of an increase in the size of facility and an increase in cost.

(3) The weir portions 122 extend over the entire lengths in the circumferential direction of the ends 130 in the direction perpendicular to the radial direction of the stator core 101. In addition, the ends 130 of a pair of coil conductors 102 are adjacent to each other in the radial direction at overlapping positions in the circumferential direction of the stator core 101, and the weir portions 122 are formed on the sides opposite to the sides where the ends of the pair of coil conductors 102 face each other. Thus, the jointing material 110 is blocked from flowing to the adjacent joint parts 104 in the radial direction during welding. This prevents short circuit of the stator winding 103.

(4) The weir portions 122 are formed to rise from only one sides of the end faces 121 of the ends 130 of the coil conductors 102. This allows the jointing material 110 to flow to stick out from the sides of the end faces 121 on which no weir portions 122 are formed, which increases the joint area.

Second Embodiment

Figure 7:
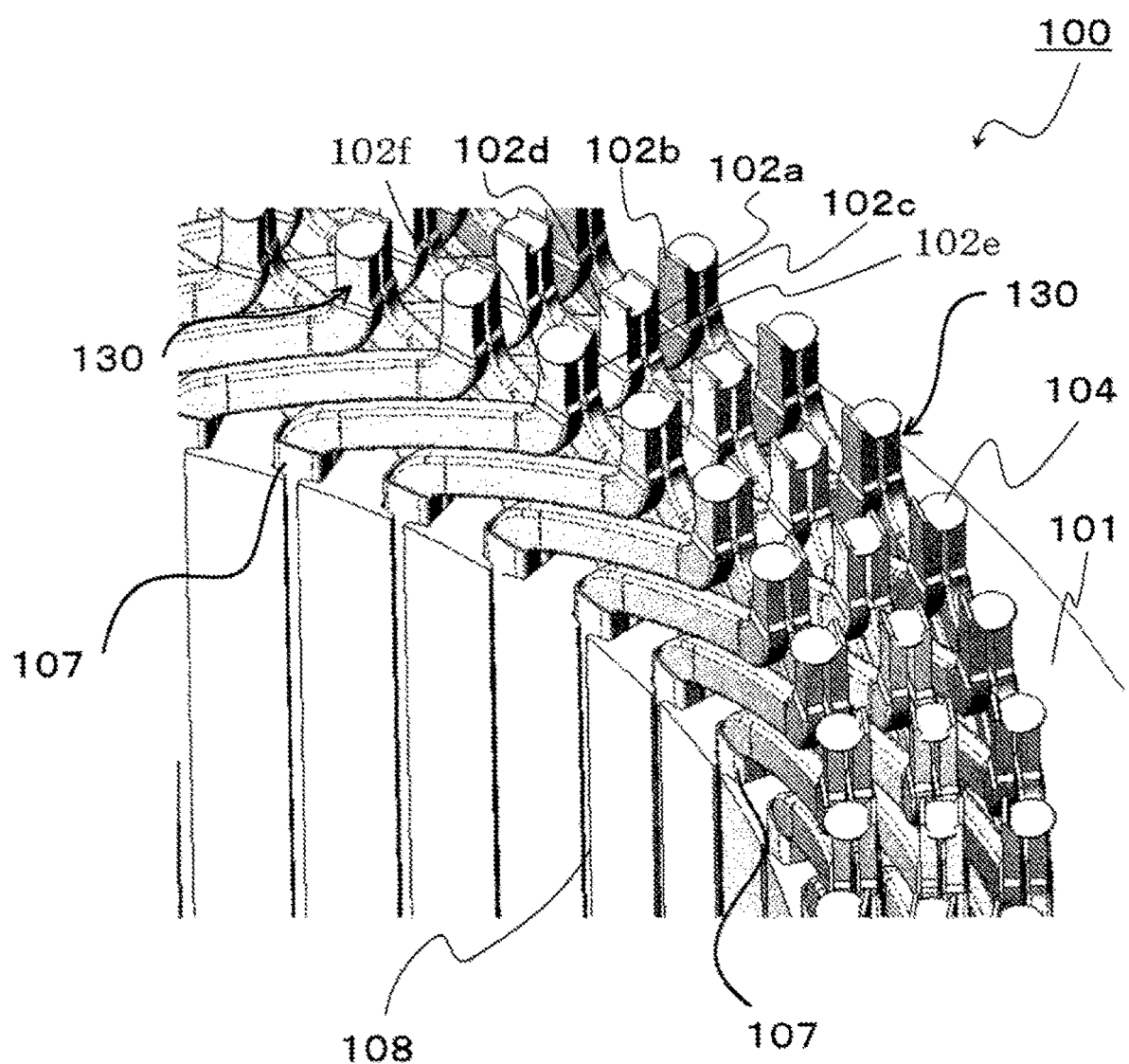
FIG. 7 is an enlarged perspective view illustrating a second embodiment of the invention, and illustrates the vicinity of a joint part of a stator of a rotating electric machine.
Figure 8:
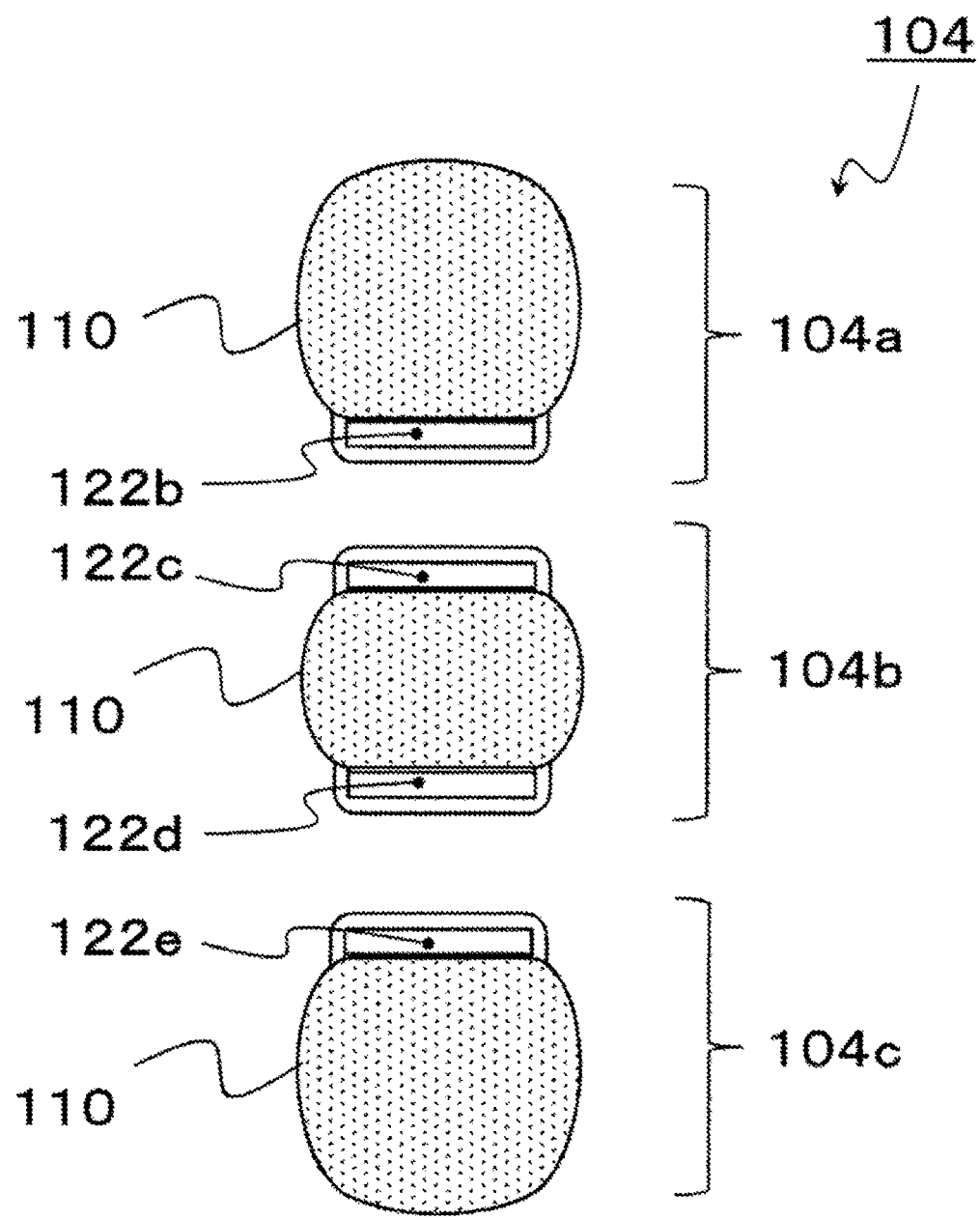
FIG. 8 is an enlarged plan view of joint parts of coil conductors illustrated in FIG. 7 as viewed from end face sides of the coil conductors.
Figure 9:
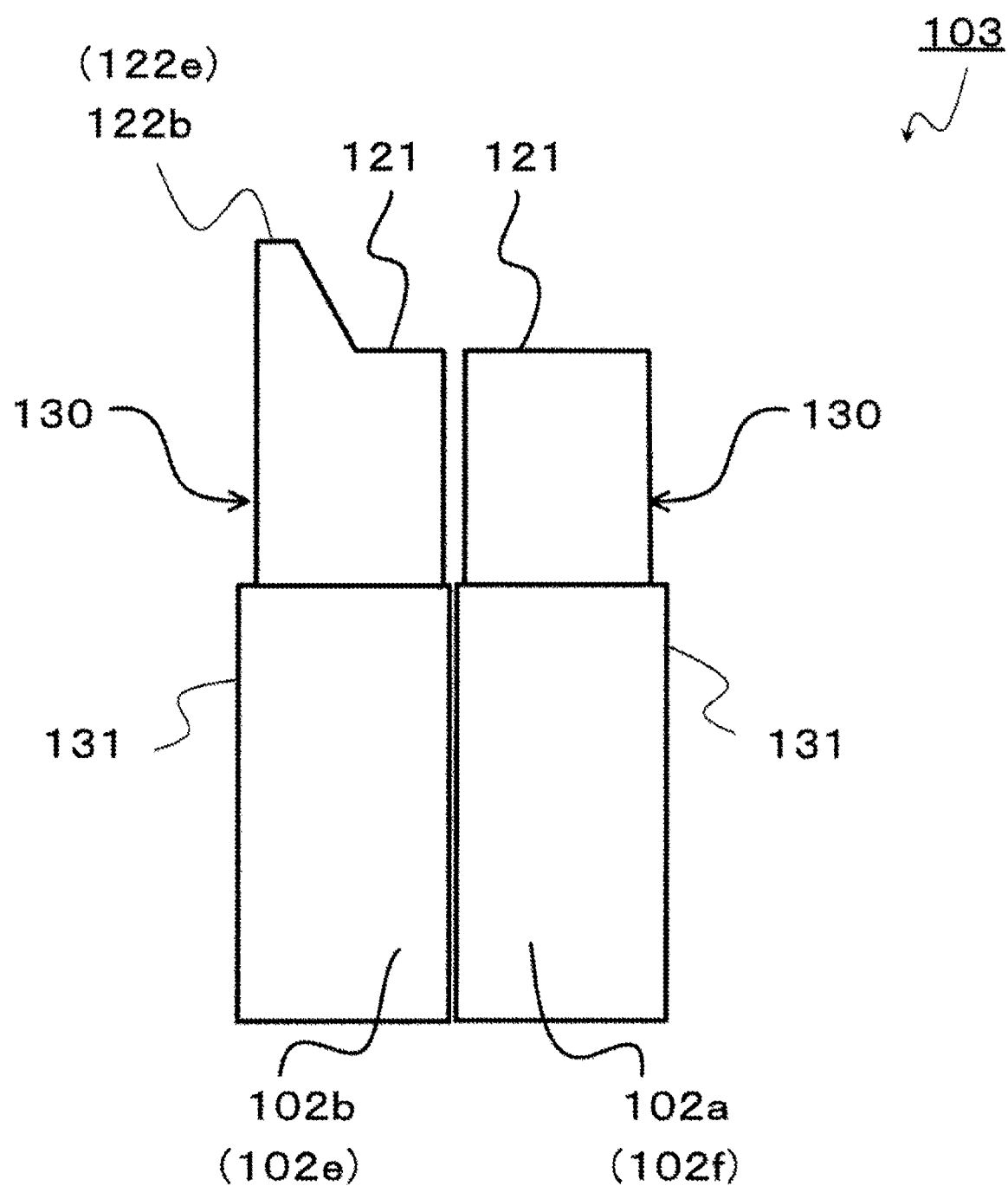
FIG. 9 is an enlarged side view illustrating a structure before welding in the vicinity of an end of an outermost or innermost coil conductor illustrated in FIG. 7 as viewed in a direction perpendicular to a radial direction of a stator core.

FIG. 7 is an enlarged perspective view illustrating a second embodiment of the invention, and illustrates the vicinity of a joint part of a stator of a rotating electric machine. FIG. 8 is an enlarged plan view of the vicinity of ends of coil conductors illustrated in FIG. 7 as viewed from end face sides of the coil conductors, and FIG. 9 is an enlarged side view illustrating the vicinity of an end before welding of an outermost or innermost coil conductor illustrated in FIG. 7 as viewed in a direction perpendicular to a radial direction of a stator core. In the second embodiment, weir portions 122a and 122f are not formed on the outermost coil conductor 102a and the innermost coil conductor 102f. As illustrated in FIG. 9, the entire end face 121 of the end 130 of the outermost coil conductor 102a is formed to be flat. A weir portion 122b is formed on a side on the inner side of the end 130 of the coil conductor 102b adjacent to the inner side of the coil conductor 102a. Similarly, the entire end face 121 of the end 130 of the innermost coil conductor 102f is formed to be flat, and a weir portion 122e is formed on a side on the outer side of the end 130 of the coil conductors 102e adjacent to the outer side of the coil conductor 102f.

The structure of the joint part 104b of the coil conductors 102c and 102d is the same as that in the first embodiment. Thus, as illustrated in FIG. 8, weir portions 122c and 122d are formed on a side on the outer side of the end 130 of the coil conductor 102c and on a side on the inner side of the end 130 of the coil conductor 102d, respectively.

At the joint part 104b, the jointing material 110 is thus blocked by the weir portions 122c and 122d, and does not stick out to the outer side of the weir portion 122c and the inner side of the weir portion 122d. As a result, the joint part 104b does not short-circuit to the joint part 104a on the outer side and the joint part 104c on the inner side.

At the joint part 104a, the jointing material 110 sticks out to the outer side of the coil conductor 102a. No coil conductor 102 constituting the stator winding 103 is, however, provided on the outer side of the joint part 104a. In addition, at the joint part 104c, the jointing material 110 sticks out to the inner side of the coil conductor 102f. No coil conductor 102 constituting the stator winding 103 is, however, provided on the inner side of the joint part 104a. Thus, the stator winding 103 does not short-circuit due to the joint parts 104a and 104c. Other configuration of the second embodiment is similar to that in the first embodiment. The second embodiment also produces effects similar to the effects (1) to (4) of the first embodiment.

Third Embodiment

Figure 10:
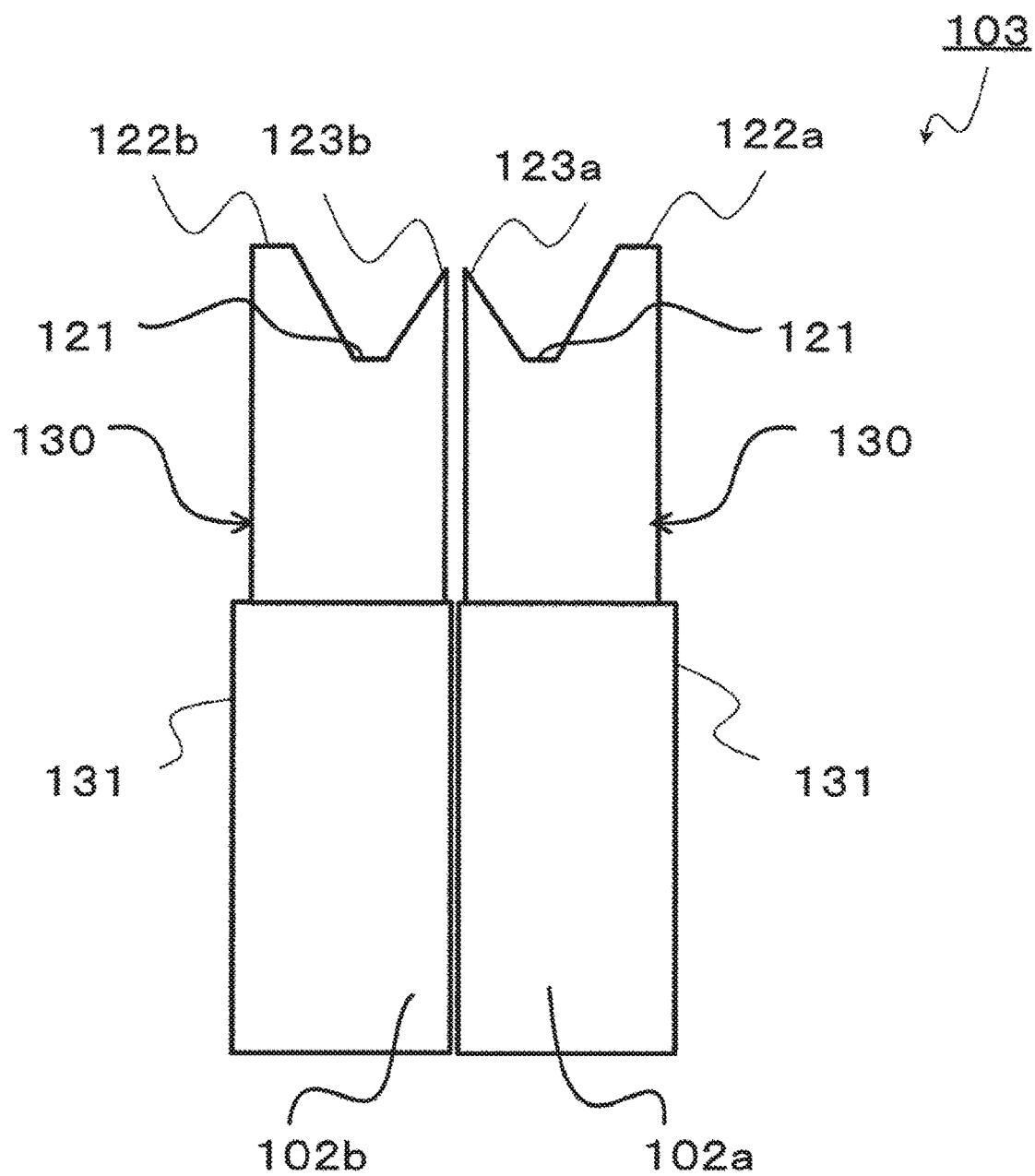
FIG. 10 is an enlarged side view illustrating a third embodiment of the invention, and illustrates a structure before welding in the vicinity of ends of coil conductors as viewed in a direction perpendicular to a radial direction of a stator core.

FIG. 10 is an enlarged side view illustrating a third embodiment of the invention, and illustrates a structure before welding in the vicinity of ends of coil conductors as viewed in a direction perpendicular to a radial direction of a stator core. The third embodiment has a structure in which projections 123a and 123b having a smaller height than the weir portions 122a and 122b are formed on sides of a pair of joined coil conductors 102a and 102b on the side facing each other. At an upper portion of an end 130 of the outermost coil conductor 102a, the weir portion 122a is formed on a side on the outer side and the projection 123a is formed on a side on the inner side. A flat end face 121 is formed at the boundary between the weir portion 122a and the projection 122a. At an upper portion of an end 130 of the coil conductor 102b on the inner side of the coil conductor 102a, the weir portion 122b is formed on a side on the inner side and the projection 123b is formed on a side on the inner side. A flat end face 121 is formed at the boundary between the weir portion 122b and the projection 123b.

The projections 123a and 123b have smaller heights and smaller bottom surface areas than the weir portions 122a and 122b. Thus, the projections 123a and 123b have smaller volumes than the weir portions 122a and 122b. The projection 123a and the projection 123b are arranged adjacent to each other in the radial direction at overlapping positions in the circumferential direction of the stator core 101. The weir portions 122a and 122b are arranged on the sides opposite to the sides where the projection 123a and the projection 123b face each other. The projections 123a and 123b are formed as portions of the coil conductors 102a and 102b to be actively melted during welding. Melting of the projections 123a and 123b mitigates thermal impact on the weir portions 122a and 122b. This improves the performance of blocking molten metal by the weir portions 122a and 122b.

Other configuration of the third embodiment is similar to that of the first embodiment. The third embodiment produces the effects (1) to (3) of the first embodiment. In addition, according to the third embodiment, the blocking performance of the weir portion 122 is improved. Note that, similarly to the second embodiment, no weir portions 122a and 122f may be formed on the outermost coil conductor 102a and the innermost coil conductor 102f.

Figure 11:
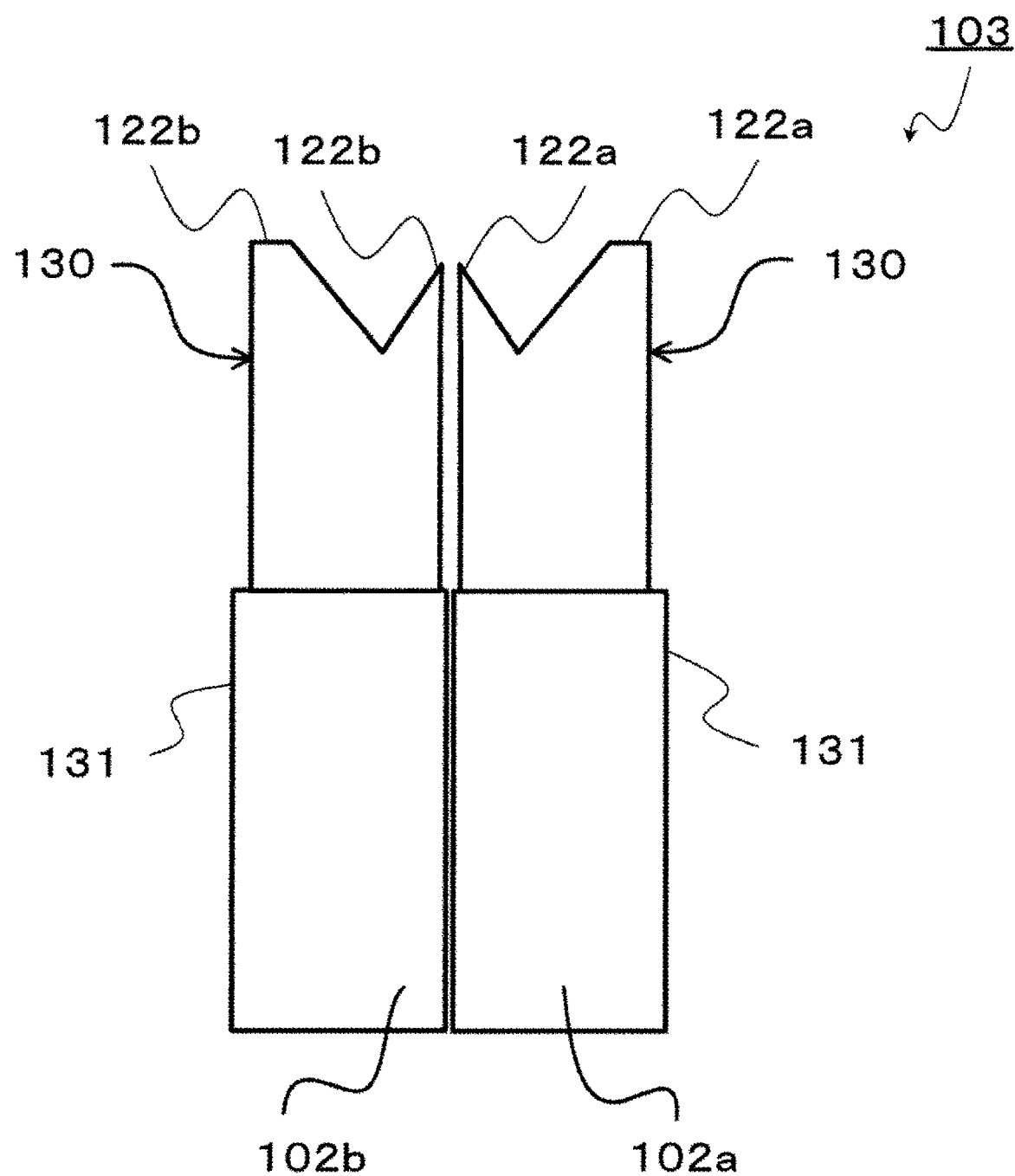
FIG. 11 is a modification of the structure in the vicinity of the ends of the coil conductors illustrated in FIG. 10.

FIG. 11 is a modification of the structure in the vicinity of the ends of the coil conductors illustrated in FIG. 10. In the modification of the third embodiment illustrated in FIG. 11, no flat end face 121 is formed at the upper portions of the ends 130 of the coil conductors 102a and 102b. At the upper portions of the ends 130 of the coil conductors 102a and 102b, the weir portions 122a and 122b and the projections 123a and 123b are formed. No flat end faces 121, however, are formed at the boundaries of the weir portions 122a and 122b and the projections 123a and 123b. Such a structure also produces effects similar to those of the third embodiment.

In the embodiments described above, the structure in which six coil conductors 102 are inserted in one slot 105 has been presented as an example. The invention, however, is not limited thereto, and can be applied to any stator 100 in which the number of coil conductors 102 inserted in one slot 105 is four or more.

In the embodiments described above, the coil conductors 102 have been presented as members called rectangular wires having a substantially rectangular cross-sectional shape. The coil conductors 102, however, may be round wires.

While various embodiments and modifications are described above, the invention is not limited to these embodiments and modifications. The embodiments described above can be combined, and other aspects conceivable within the technical ideas of the invention are also included in the scope of the invention. In other words, the present invention is applied to various rotating electric machines having the following configuration. A rotating electric machine according to the invention includes a rotor, and a stator having a stator core and a stator winding. The stator winding has a plurality of coil conductors, and joint parts connecting ends of the coil conductors protruding from an end face of the stator core, and weir portions (molten metal flow blocking weirs) for blocking flow of metal of the joint parts are formed at the ends of the coil conductors.

REFERENCE SIGNS LIST 100 stator
101 stator core
101a first end face
101b second end face
102a to 102f coil conductor
103 stator winding
104, 104a to 104c joint part
105 slot
110 jointing material
122, 122a to 122f weir portion
121, 121a to 121f end face
123a, 123b projection
130 end
131 insulating coating
200 rotor
201 shaft

The invention claimed is:
1. A rotating electric machine comprising:
a rotor; and
a stator having a stator core and a stator winding, wherein
the stator winding has a plurality of coil conductors, and joint parts connecting ends of the coil conductors protruding from an end face of the stator core, and the ends of the coil conductors have weir portions formed for blocking flow of metal of the joint parts, the ends of the coil conductors have flat end faces, the weir portions are molten metal flow blocking weirs protruding from the end faces in an axial direction of the stator core, and the end faces of the ends of a pair of coil conductors constitute a joint part, the weir portions extend in a direction perpendicular to a radial direction of the coil conductors, the joined ends of a pair of coil conductors are arranged adjacent to each other in the radial direction at overlapping positions in a circumferential direction of the stator core, and the weir portions are formed on sides opposite to sides where the pair of coil conductors face each other, the weir portions are respectively formed on the pair of joined coil conductors, and projections having smaller heights than the weir portions are provided on overlapping sides of the ends of the pair of joined coil conductors.

2. The rotating electric machine according to claim 1, wherein insulating coating is formed over outer side faces of the coil conductors inserted in the slots, and the insulating coating is removed at the ends of the coil conductors.

3. A method for manufacturing the rotating electric machine according to claim 1, the method comprising:
joining a pair of coil conductors at the ends of the coil conductors by TIG welding or TIG brazing.

4. A rotating electric machine comprising:
a rotor; and
a stator having a stator core and a stator winding, wherein the stator winding has a plurality of coil conductors, and joint parts connecting ends of the coil conductors protruding from an end face of the stator core, and
the ends of the coil conductors have weir portions formed for blocking flow of metal of the joint parts,
the weir portions rise only from one side of ends of the coil conductors, thereby allowing a material of the joint parts to flow and to stick out from another side of the ends of the coil conductors on which no weir portions rise, thereby increasing the joint area; the ends of the coil conductors further comprising a flat end faces and a sloped surfaces connecting the weir portion and the flat end faces.

5. The rotating electric machine according to claim 4, wherein the ends of the coil conductors have flat end faces, the weir portions are molten metal flow blocking weirs protruding from the end faces in an axial direction of the stator core, and the end faces of the ends of a pair of coil conductors constitute a joint part.

6. The rotating electric machine according to claim 5, wherein the weir portions extend in a direction perpendicular to a radial direction of the coil conductors.

7. The rotating electric machine according to claim 6, wherein the joined ends of a pair of coil conductors are arranged adjacent to each other in the radial direction at overlapping positions in a circumferential direction of the stator core, and
the weir portions are formed on sides opposite to sides where the pair of coil conductors face each other.

8. The rotating electric machine according to claim 7, wherein the weir portions are respectively formed on the pair of joined coil conductors.

9. The rotating electric machine according to claim 8, wherein projections having smaller heights than the weir portions are provided on overlapping sides of the ends of the pair of joined coil conductors.

10. The rotating electric machine according to claim 4, wherein insulating coating is formed over outer side faces of the coil conductors inserted in the slots, and the insulating coating is removed at the ends of the coil conductors.

11. A method for manufacturing the rotating electric machine according to claim 4, the method comprising:
joining a pair of coil conductors at the ends of the coil conductors by TIG welding or TIG brazing.

\* \* \* \* \*